Feb. 28, 1967  B. E. MURPHY  3,306,016
TIRE DRIVEN ROTARY CUTTER
Filed Jan. 30, 1964  3 Sheets-Sheet 1
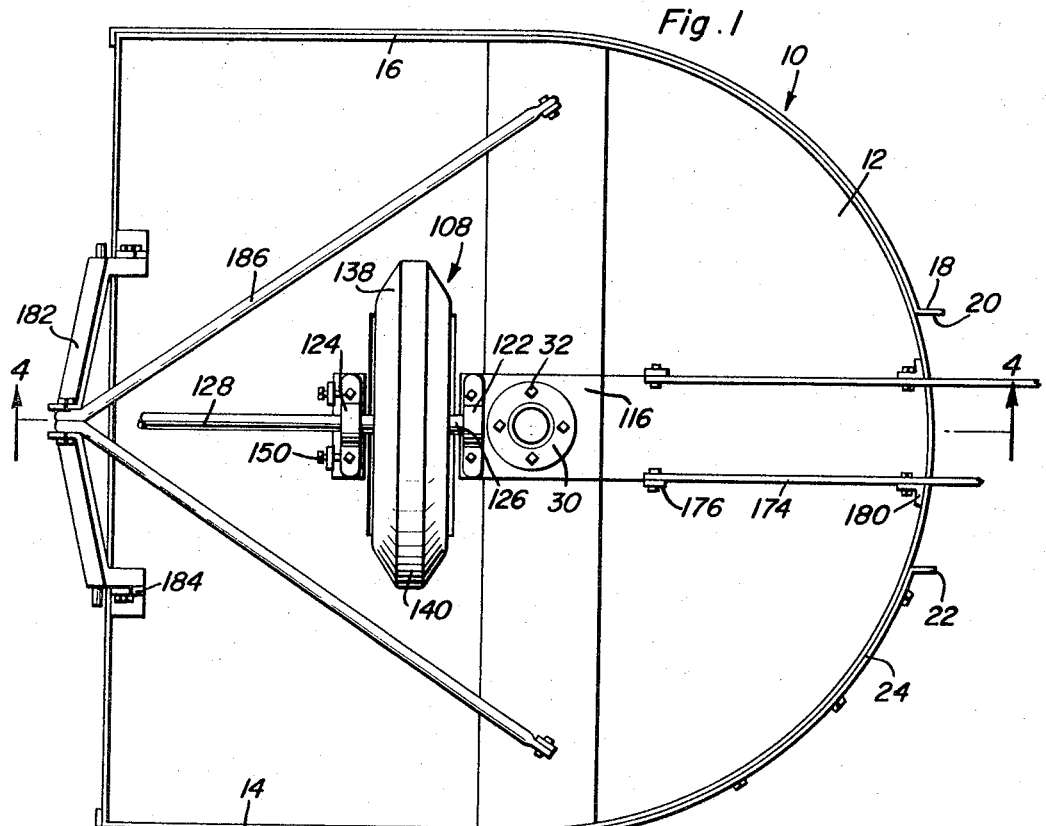
Bynum E. Murphy
INVENTOR.

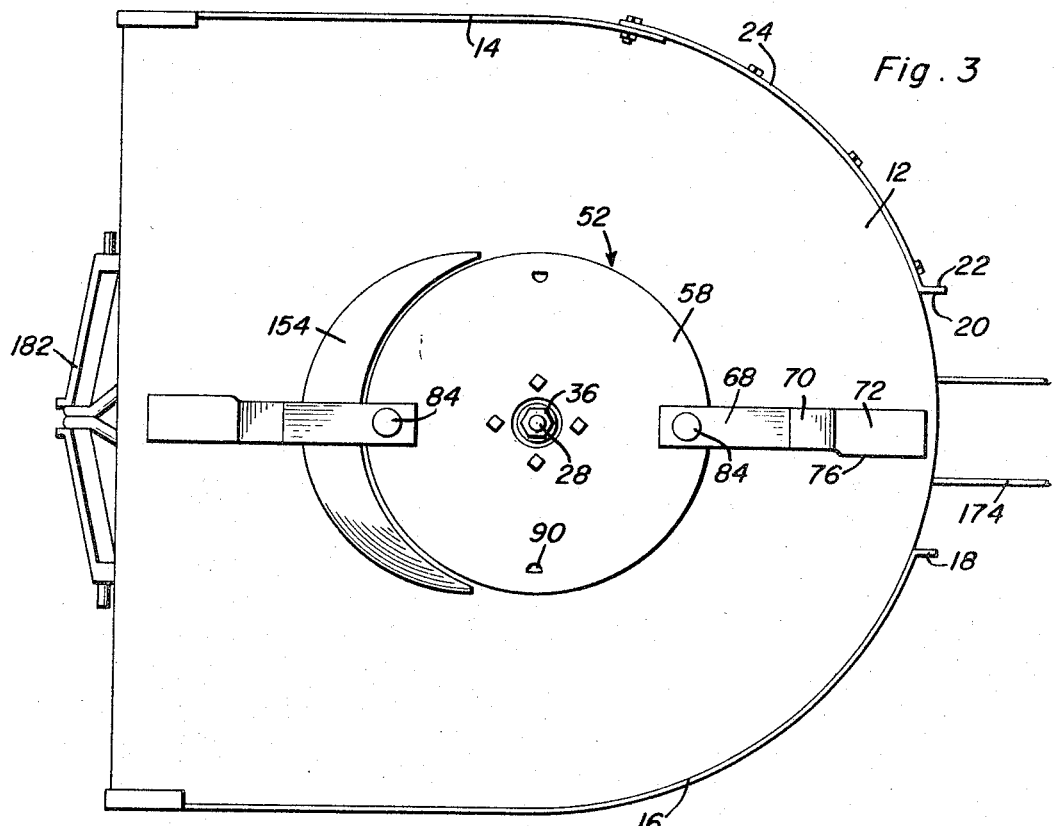
Fig. 3
Fig. 5
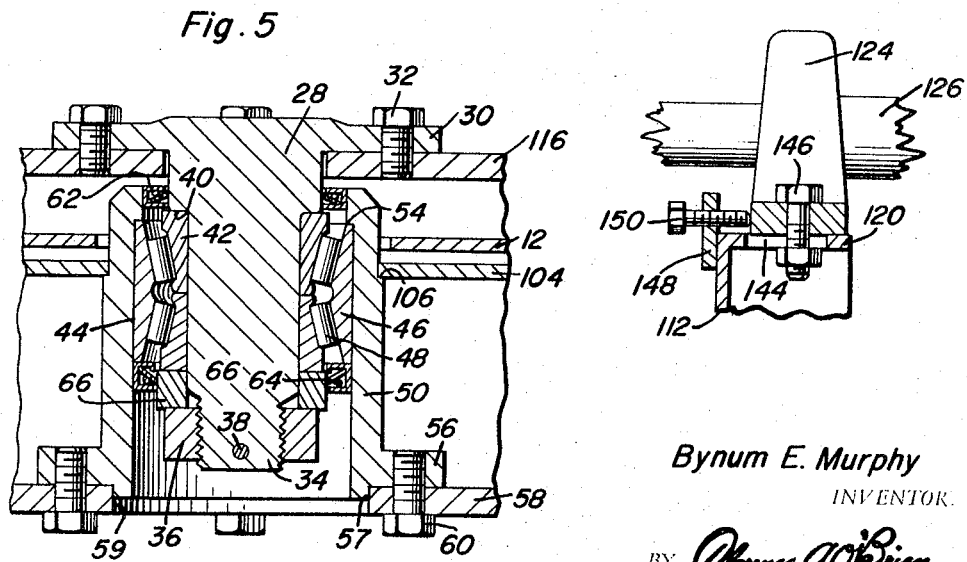
Fig. 6
Bynum E. Murphy
INVENTOR.

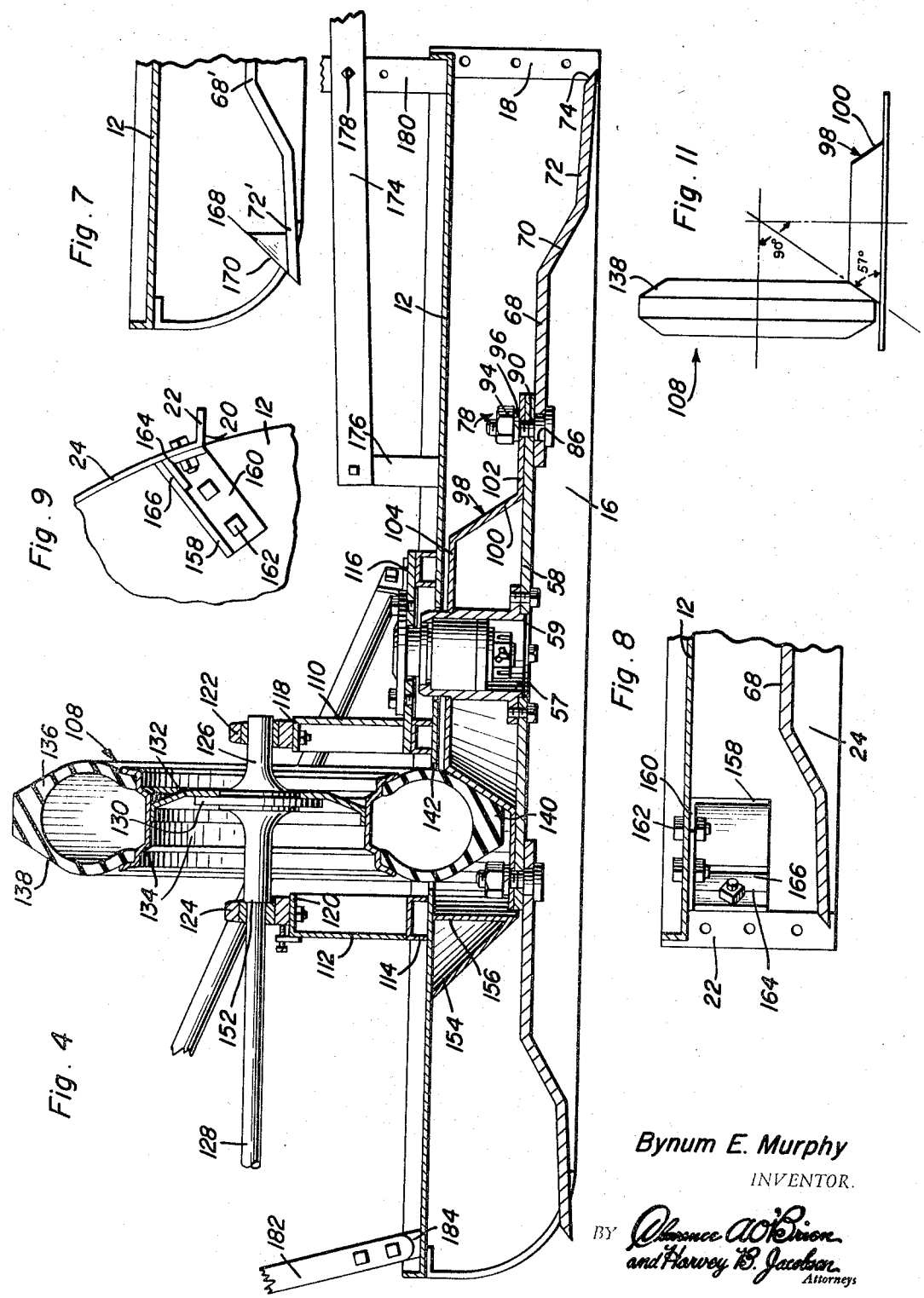

United States Patent Office 3,306,016
Patented Feb. 28, 1967

3,306,016
TIRE DRIVEN ROTARY CUTTER
Bynum E. Murphy, Minden, La., assignor to Anderson-Dunham, Inc., doing business as Dunham Manufacturing Company, Minden, La., a corporation of Louisiana
Filed Jan. 30, 1964, Ser. No. 341,187
19 Claims. (Cl. 56—25.4)

The present invention generally relates to a rotary cutter or mower and more particularly to a rotary cutter having a friction drive of constant ratio employing an inflated pneumatic tire as the driving member, the cutter adapted to be carried by or towed by a tractor having a power take-off with the pneumatic tire being driven from the power take-off of the towing tractor or vehicle.

An object of the present invention is to provide a rotary cutter having a blade means rotatably supported on a stationary depending central shaft affixed to the main deck of the cutter whereby the cutting force will be applied continuously against one side of the shaft thereby eliminating constant application of the cutting force on opposite sides of the shaft as occurs when the blade means is attached to a rotatable shaft thus reducing the tendency of shaft failure due to metal fatigue and the like.

A further object of the present invention is to provide a rotary cutter in which a blade means is provided with an annular inclined surface engageable with an inclined surface on a pneumatically inflated tire in which the axis of rotation of the tire and the axis of roation of the blade means is oriented in perpendicular intersecting relation with adjustment of the tire for compensating for wear being in the actual direction along the axis of rotation thereof whereby such adjustment will not affect the ratio between the drive member and the driven member.

A further important object of the present invention is to provide a rotary cutter having a shield to prevent stumps or rocks from coming into engagement with a blade holder which forms part of the blade means to further protect the rotary cutter.

Still another feature of the present invention is to provide a rotary cutter having in its construction a blade means including a blade holding plate or disk with a plurality of freely swingable blades thereon together with a novel bolt assembly for retaining the blades on the blade holder.

Still another object of the present invention is to provide a rotary cutter having a removable section of the depending flange on a deck to enable the material being cut to readily egress therefrom.

Yet another feature of the present invention is to provide a rotary cutter in which the rotational axis of the blade means is offset to one side of the housing to provide additional room at said one side of the housing to enable hay to be discharged from the blade without excessive shredding.

Still another important feature of this invention is to provide an attachment in the form of a deflector plate extending inwardly and inclined in the direction of rotation of the blade means thereby returning the material back to the blade for extra shredding, the blade also being provided with a projection of generally triangular configuration to prevent egress of the material from the blade.

A further object of the invention is to provide a rotary cutter which is relatively simple in construction, rugged, dependable and long lasting, easily adjustable and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the rotary cutter of the present invention;
FIGURE 2 is a side elevational view of the cutter;
FIGURE 3 is a bottom plan view of the cutter;
FIGURE 4 is an enlarged longitudinal, sectional view taken substantially upon a plane passing along section line 4—4 of FIGURE 1 illustrating structural details of the invention;
FIGURE 5 is a detailed sectional view, on an enlarged scale of the stationary shaft and rotatable hub forming part of the blade means;
FIGURE 6 is a detailed sectional view illustrating the structure of the adjusting means for the shaft or axle which supports the driving wheel;
FIGURE 7 is a detailed view of the blade with an attached projection thereon illustrating a modified form of blade;
FIGURE 8 is a detailed sectional view illustrating the attachment of a deflector plate on the cutter;
FIGURE 9 is a bottom plan view of the deflector plate illustrated in FIGURE 8;
FIGURE 10 is a perspective view of a securing bolt for securing the blade to the blade holder or plate; and
FIGURE 11 is a schematic view illustrating the relation between the drive tire and the driven member.

Referring now specifically to the drawings, the numeral 10 generally designates the rotary cutter of the present invention that is adapted to be attached to the three-point suspension system of a tractor or may be provided with supporting wheels and attached to the tow bar of a tractor and also is adapted to be connected with the power take-off shaft of a tractor (not shown). The rotary cutter includes a mobile frame including a generally flat horizontally disposed deck 12 having a transverse straight forward end and a semi-circular rear end as illustrated in FIGURES 1 and 3. A depending side flange 14 is provided on one side of the deck and a depending side flange 16 is provided on the other side with the side flanges 14 and 16 extending throughout the length of the parallel side edges of the deck with the flange 16 extending rearwardly and around a portion of the semi-circular rear end to an exit flange 18 defining a discharge opening 20 together with an exit flange 22 at the opposite end thereof on one end of a removable flange 24 that is secured to the flange 14 by bolts 25 along the top edge thereof and bolts 26 along the edge thereof remote from flange 22 thereby enabling the flange 24 to be removed for increasing the size of the egress opening. The forward ends of the side flanges 14 and 16 are upturned to define skids for the cutter 10.

The deck 12 is provided with a depending shaft 28 having a peripheral flange 30 at the upper end thereof lying against the upper surface of the deck 12 and secured thereto by removable setscrews 32 or the like. The shaft 28 has a threaded lower end portion 34 receiving a retaining nut 36 with a suitable transverse cotter pin 38 or the like employed for securing the nut 36 in place. The major length of the shaft 28 is of constant cross-sectional area with there being a shoulder 40 defined at the upper end portion of the constant cross-sectional area of the shaft 28 for receiving an inner bearing race 42 which is a part of a thrust bearing assembly 44 that also includes an outer race 46 and two inclined sets of roller bearings 48 thus forming a journal for a cylindrical hub 50 forming a part of a rotatable blade means generally designated by the numeral 52. The hub 50 includes an inwardly extending flange 54 engaging the upper end of the outer bearing race 46 and this supports the hub 50 from the shaft 28 in a rotatable manner. The lower end of the hub 50 is provided with an outwardly extending flange 56 that is attached to a central plate or blade carrier in the form of a disk 58 by cap screws 60 thereby detachably securing the plate or disk 58 to the hub 50 for rotation therewith. A shoulder 57 is machined on the lower end of the hub 56 (see FIGURE 5) which is snugly received in an opening 59 in plate 58 thereby relieving bolts 60 of excessive strain particularly when shock loads are encountered by plate 58.

A grease seal 62 is interposed between the inner edge of the flange 54 and the shaft 28 and the upper end thereof and a similar grease seal 64 is interposed between the lower end of the hub 50 and a spacer or washer 66 disposed between the nut 36 and the inner race 42. Thus, the blade means 52 is rotatably suspended on the shaft 28 with the shaft 28 being stationarily attached to the deck 12.

The blade means 52 includes a pair of diametrically opposed blades 68 carried by the circular plate or disk 58. Each of the blades 68 has a downwardly offset intermediate portion 70 and a slightly downwardly inclined outer end portion 72 which has a beveled outer end edge 74 and also a beveled leading edge 76 forming cutting surfaces for the material being cut.

A novel bolt means 78 is provided for securing the blade 68 to the plate 58 for free swinging movement. The bolt means includes a threaded shank 80 provided with an enlarged circular or cylindrical portion 82 at the end thereof which is also provided with a rounded head 84 of cylindrical configuration. The head 84 engages the bottom surface of the blade 68 and the blade 68 has an opening 86 therein receiving the cylindrical portion 82. The upper end of the cylindrical portion 82 defines a shoulder 88 for abutting engagement with the bottom surface of the plate 58 which has an aperture 90 therein provided with a flat edge portion to conform with and receive the flattened side 92 of the threaded shank 80 of the bolt 78. Thus, the bolt 78 will not rotate and the shoulder 88 abutting the undersurface of the plate 58 will enable free swinging rotation of the blades 68 when they are mounted. A suitable nut 94 and lock washer 96 is mounted on the upper end of the bolt 78 to securely lock the blades 68 to the rotatable plate or disk 58. As illustrated in FIGURE 3, the apertures 90 in the plate 58 are disposed at several diametrically opposed points for mounting the blades at any of several desired locations. This enables more or less blades to be mounted on the plate if desired.

The blade means also includes a driven member generally designated by numeral 98 and including an inclined annular surface 100 concentric with the axis of rotation of the hub 50 and which defines generally a frusto-conical surface. The lower edge of the annular inclined surface 100 is provided with an outwardly extending horizontal flange 102 while the upper edge of the surface 100 is provided with an inwardly extending horizontal flange 104 which seats on a shoulder 106 machined on the surface of the hub 50 thereby greatly increasing the strength and rigidity of the cone part and providing a more effective means to prevent foreign material such as grass or the like from getting between the two blade carrier sections. The flange 102 is securely bolted to the plate or blade carrier 58 by virtue of the bolts 78 inasmuch as the flange 102 has apertures therein receiving the bolts 78 for securely attaching the driven member 98 to the plate 58. The additional apertures 90 in the plate 58 enables the driven member 98 to be secured thereto at a plurality of points in addition to the points where blades 68 are attached if desired.

A drive means 108 is mounted on the deck 12 by means of a pair of upstanding brackets 110 and 112 which are welded to or otherwise secured to transverse inverted channel-iron members 114 which also serve to mount the attaching plate 16 to the deck 12 as illustrated in FIGURE 4 thus forming a rigid support for the shaft means including the shaft 28 as well as a rigid support for the upstanding brackets 110 and 112 which may be of any suitable configuration such as of angle iron construction or the like. The bracket 110 includes a horizontally disposed upper member 118 while the bracket 112 includes a horizontal upper member 20. The horizontal supporting plates 118 and 120 support pillow block bearing assemblies 122 and 124 which rotatably support an axle 126 connected with a drive shaft 128. The axle 126 has a flange 130 thereon for detachable engagement with the center hubs 132 of a wheel rim 134 having a pneumatically inflated rubber tire 136 thereon. The wheel rim 134 may be of the drop center type and the pneumatically inflated tire 136 may be of either the tubeless type or the type having a tube therein. The external configuration of the tire 136 is formed with a pair of inclined surfaces 138 thereon interconnected by an outer peripheral surface 140. The inclination of the surfaces 138 is complementary to the inclination of the annular inclined surface 100 on the drive member 98 for frictional driving engagement therewith as illustrated in FIGURE 4. A portion of the pneumatic tire 136 is received in an enlarged opening 142 in the deck 12 and frictiontionally engages the annular surface 100. The axis of rotation of the pneumatic tire 136 as defined by the axle 126 is perpendicular to and intersects the axis of rotation of the driven member 98 so that by varying the position of the pneumatic tire 136 axially of its axis of rotation, the frictional engagement between the tire 136 and the annular surface 100 may be varied.

FIGURE 6 illustrates one manner of adjusting the axle 126 axially and this includes slots 144 in the horizontal support member 120 together with bolts 146 extending down through the flanges on the pillow block 124 through the slots 144 for enabling the pillow block to be adjusted inwardly and outwardly in relation to the bracket 112. The outer surface of the bracket 112 is provided with a pair of upstanding lugs 148 each having a screw-threaded member 150 extending therethrough whereby the screw-threaded member 150 may be employed for moving the bearing block 124 for moving the axle 126 toward the axis of rotation of the annular surface 100. The axle 126 is provided with a shoulder 152 thereon for engagement by the pillow bearing block assembly 124 for moving the axle 126 axially when the bolts 146 are loosened and the threaded elements 150 are rotated in a manner to advance the tire 136 toward the annular surface 100. The opposite end of the axle 126 received in the pillow bearing block 122 may be slidable in the pillow bearing block and means may be provided to prevent free axial movement of the axle 126 in the bearing block except when the axle is loosened for enabling longitudinal movement of the axle 126 in the pillow bearing block 122.

As will be appreciated, the inclined surfaces 133 on the tire 136 may either be brought into engagement with the inclined surface 100 by reversing the tire 136 on the rim. In lieu of this, the attaching hub 130 on the axle 126 and the particular construction of the wheel rim may be such that the attaching flange 130 will be symmetrical with respect to the two sides inclined surfaces on the tire thereby enabling the entire wheel and rim to be reversed for registering either of the surfaces 138 with the inclined surface 100 thereby increasing the effective tire life by enabling both surfaces thereof to be brought into frictional driving engagement with the surface 100.

Disposed forwardly of the rotatable plate 58 is an inclined guard or shield 154 which is inclined rearwardly and towards the plate 58 and is generally frusto-conical in configuration with the lower edge thereof being disposed in front of and generally flush with the leading edge of the rotatable plate 58. The inclined member 154 is reinforced by a vertical wall member 156 at the rear edge thereof thus rigidifying the inclined surfaces 154. The members 154 and 156 are secured to the deck 12 by suitable welding or the like and due to the rearward and downward slope thereof which extends down to a level with the bottom of the plate or blade holder 58, the guard 154 serves as a shield against stumps and the like to protect the plate, hub and shaft assembly from hitting solid objects which the blades were unable to cut. Being cone-shaped configuration and sloping to the rear, it acts somewhat like the runners on a sled to skid the machine up and over solid objects. The guard does not form any obstruction on the underside of the deck insofar as movement of the material being cut is concerned. In fact, the underside or shredding body of the machine is free of any reinforcing members to allow a smooth area for cutting hay with all the reinforcements being on top of the deck.

For shredding stalks, weeds and the like, there is provided an attachment in the form of a deflector plate or baffle 158 that has a top flange 160 secured to the deck 12 by a pair of bolts 162. The baffle 158 is located immediately inwardly of the flange 22 and, of course, immediately inwardly of one edge of the exit opening 20 to deflect the material back towards the blade 68 before it discharges from the discharge opening 20. The baffle or deflector 158 is inclined inwardly and in the direction of rotation of the blade 68 for the purpose of deflecting the material being cut. For rigidifying the baffle or deflector 158, there is provided an angle iron member 164 bolted to the flange 24 and having a short flange 166 lying against the inner surface of the deflector plate or baffle 158 thus rigidfying the baffle 158. The baffle 158 extends down from the underneath side of the machine to within approximately two inches of the blades 68 and it extends in approximately two inches from the left hand skirt or flange 24. This reduces the clearance between the ends of the blades and the flange or sides and the baffle is set at approximately 15 degrees to the radius of the machine and helps to feed the material being shredded back into the path of the blades.

Also, as illustrated in FIGURE 7, a shredder type blade 68' is used in which there is provided an upstanding triangular projection 168 welded to or otherwise secured to the outer end portion 72' of the blade 68'. The triangular projection 168 is set at an angle to the longitudinal axis of the blades 68' thus giving it an inward suction to pull the material in from the sides of the machine and also, the projections prevent the material from escaping from the ends of the blade. The leading edge of the fin or projection 168 is sharpened as at 170 and helps to shred the material as it passes under the baffle 158. Thus, due to the additional shredding action caused by the sharpened edge 170 as the projection passes under the baffle plate 158 and due to the inclination of the projection 168 in relation to the longitudinal axis of the blade 68', the material being shredded will be effectively shredded by the combined inward suction and the shredding action of the shredding type blade.

Of course, when it is desired to use the device for cutting hay, the shredding feature is not employed. In fact, the right-hand section of the flange 14 is removed with this section being designated by numeral 24 in order to allow the hay to be discharged sooner and avoid being shredded too much. This arrangement allows the hay to be discharged to the rear and clear of the transport wheels when a pull type machine is being used. Therefore, the hay material is discharged in a loose, fluffy condition which facilitates the curing process, cutting the time necessary for curing. Also, in addition to the removable section 24 of the left-hand skirt, the rear section or discharge opening 20 is left open thereby giving an opening from flange 18 around to the area of the bolts 26 to discharge the cut hay material.

In addition to the smooth underside of the machine, the left-hand side of the machine may extend two inches farther from the center of rotation of the plate thus giving two more inches between the end of the blades and the side skirt of the machine thus giving the cut hay material room to get clear of the blades and thereby eliminating being shredded too small to be picked up and baled. The offset relationship of the side skirt or flange in relation to the rotational axis of the blades is clearly illustrated in the bottom plan view of the machine.

As pointed out previously, the pneumatically inflated tire is specially constructed with two drive surfaces but only one side or surface makes contact with the driven member. After this side is worn down to the point that no tread rubber remains, the tire can be remounted on the wheel and the unused side turned to the driven member thus doubling the service life of the tire.

As illustrated in FIGURE 11, the ratio of the driven member or conical surface to the tire is 1.55:1, that is, the driven surface or conical member 100 makes 1.55 revolutions for each revolution of the tire 136. By having a 33 degree angle or slope on the face of the cone or driven member, the ratio of 1.55:1 is maintained all along the contact area between the drive tire 136 and the driven member or surface 100. The rotational axis of the tire and cone projected, intersect at a 90° angle, the line of contact between the tire and cone projected, will pass through the intersection of the tire and cone rotational axis. This in effect, establishes a right triangle with the radius of the tire at any point on the contact surface being one leg of the triangle and the corresponding radius of the cone at the same point on the contact surface constituting the other leg of the right triangle. Therefore, at all points on the contact surface between the tire and cone the ratio of the corresponding tire and cone radii remain constant.

The above principle can be applied to any combination of tire and cone radii. The net effect of this arrangement allows better traction and prevents any skidding action due to a variation in the ratio along the contact surface. This, in turn, will eliminate tire wear due to skidding and heat build-up on the drive surface of the tire.

To give an idea of what takes place when this relation is not maintained, when a 45° angle of slope is used on the tire and cone while maintaining the largest diameter of the tire and cone to the 1.55:1 ratio, the ratio will vary from 1.55:1 to 1.82:1 in that the line of contact between the tire and cone does not pass through the point of intersection between the tire axis and cone axis. For every revolution of the tire, there would be approximately 11" of skidding on the small diameter of the tire if the large diameter of the tire did not slip on the cone. For supporting the cutter, there is provided a full caster tail wheel 172 supported by a pair of arms 174 pivoted to lugs 176 and adjusted by bolts 178 extending through selected apertures in upstanding brackets 180 on deck 12 for easily adjusting the cutting height. A heavy duty A frame 182 is mounted on lugs 184 at the front of the deck 12 with braces 186 being provided for rigidifying the A frame 182. The cutter could also be provided with a "pull" type towing arrangement if desired.

While the forward end of the drive shaft 128 is broken off, it is pointed out that it is connected to the power take-off shaft of the tractor through a universal shaft assembly which may be telescopic or of any suitable construction and this is a source from which the tire receives its power to drive the blade assembly.

The necessary pressure between the tire and the driven surface 100 is provided and regulated by the adjustment screws on the upper end of the bracket 112. By this method of adjusting the pressure, the tire and the annular surface 100 maintain their exact contacting relation to each other at all times regardless of the adjustment, therefore maintaining their exact ratio with each other. In distinction, if the pressure adjustment was achieved by inserting or removing shims under the pillow block bearings, the ratio would change thus causing a skidding action between these two members.

Another factor is the use of the bolt to secure the plate 58 and the driven member together which eliminates the necessity of welding the two members together thereby eliminating internal stresses which is always set up by such welding and which easily cause warpage and other problems incident to a welding operation.

The stationary shaft and the hub rotatable thereon which supports the blade assembly is significant inasmuch as the hub rotates while the shaft is stationary. This arrangement eliminates the cutting load of the blade from being applied on opposite sides of the shaft as is the situation where the shaft rotates. When the shaft rotates and the loads are applied on opposite sides thereof, a back and forth flexing action is set up in the shaft which eventually causes fatigue in the metal and the shaft breaks as a result. When the hub rotates as in the present invention, the shaft flexes back in only one direction and remains there as long as the cutting load of the blades are the same and only returns to its no load positions as the load decreases. Thus, far less flexing is set up in the shaft thus decreasing metal fatigue and increasing the servie life of the shaft. Also, the arrangement of the retaining nut enables the nut to be tightly set up without preloading the bearings which is a very desirable feature and the seals retain the grease in place and keep dirt out of the bearing assemblies.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A rotary cutter comprising a mobile frame including a deck, shaft means depending from said deck, blade means rotatably supported from said shaft means, and drive means engaged with said blade means in spaced relation to said shaft means for rotating the blade means about the longitudinal axis of the shaft means, said shaft means including a shaft fixedly attached to said deck generally in the central area thereof, said deck including at least a partial depending flange disposed peripherally of said blade means, said blade means including a plate having a central hub affixed thereto, said hub being telescoped over the lower portion of said shaft, thrust bearing means interposed between said shaft and hub, and means on the lower end of the shaft removably securing the bearing means to the shaft thereby enabling removal of said blade means.

2. A rotary cutter comprising a mobile frame including a deck, shaft means depending from said deck, blade means rotatably supported from said shaft means, and drive means engaged with said blade means in spaced relation to said shaft means for rotating the blade means about the longitudinal axis of the shaft means, said shaft means including a shaft fixedly attached to said deck generally in the central area thereof, said deck including at least a partial depending flange disposed peripherally of said blade means, said blade means including a generally conical member having an annular inclined surface concentric with said shaft, said drive means including a circular drive wheel having a drive surface in driving engagement with said annular surface on said blade means, said drive wheel being rotatable about an axis prependicular with and intersecting the axis of rotation of said blade means, means adjustably supporting said drive wheel from said deck for varying frictional engagement between the drive surface on said drive wheel and the annular surface on said blade means.

3. The cutter as defined in claim 2 wherein said drive wheel and the supporting means therefor have the major portions thereof disposed above the deck, said deck having an opening therein receiving a portion of the periphery of said drive wheel, said opening being disposed in alignment with a portion of the inclined annular surface on said blade means.

4. The cutter as defined in claim 3 wherein said supporting means for the drive wheel includes a pair of upstanding brackets, bearing means on the upper end of each bracket, a wheel axle journalled in said bearing means, said drive wheel being affixed to said axle between said bearing means, said adjustable means for said drive wheel including thrust means on said bearing means remote from the axis of rotation of the blade means and engaging said axle in order to prevent longitudinal shifting of said axle, and adjustable means interconnecting the remote bearing means and bracket for adjusting the axle and wheel only axially of the axis of rotation thereof for moving the drive surface on the drive wheel radially towards the annular surface on said blade means.

5. The cutter as defined in claim 4 wherein said axle is adapted to be connected to the power take-off shaft of a tractor type vehicle, said remote bearing means including a pillow block, said adjustable means interconnecting the bracket and remote bearing means including a pair of slot and bolt assemblies interconnecting the pillow block and bracket, and screw-threaded moving means interconnecting the bracket and pillow block for moving the pillow block when the slot and bolt assemblies are loosened.

6. The cutter as defined in claim 2 wherein said drive wheel inclues an inflated tire of resilient material, said drive surface including a peripheral inclined surface having a complemental angle of inclination as the annular surface on said blade means, said inclined surfaces engaging each other over a major portion of the lateral and longitudinal dimensions during rotation.

7. The cutter as defined in claim 6 wherein said tire is symmetrical and provided with an inclined drive surface on each side thereof thereby enabling the tire to be flipped over when one drive surface becomes worn thereby extending the useful life of the tire.

8. The cutter as defined in claim 6 wherein the drive ratio between the tire and the blade means is approximately 1.55 to 1 and the angle of the inclined surface on the tire is approximately 33 degrees from vertical and the angle of the inclined surface on the blade means is approximately 57 degrees, said angular orientation of the inclined surfaces eliminating skidding action between the inclined surfaces during rotation.

9. A rotary cutter comprising a mobile frame including a deck, shaft means depending from said deck, blade means rotatably supported from said shaft means, and drive means engaged with said blade means in spaced relation to said shaft means for rotating the blade means about the longitudinal axis of the shaft means, said shaft means including a shaft fixedly attached to said deck generally in the central area thereof, said deck including at least a partial depending flnage disposed peripherally of said blade means, said blade means including a plate, a plurality of blades disposed around the periphery of said plate, and mean freely swingably attaching the blades to said plate, said means attaching the blades to the plate including a shouldered bolt extending through the blade and plate, a head on the bolt underlying the blade, the shoulder on the bolt engaging the plate and preventing the head from clampingly engaging the blade, a nut on said bolt engaging the plate in opposition to the shoulder for securing the bolt to the plate, said bolt being provided with an unsymmetrical area on the portion of the shank which extends through the plate, said plate having an opening conforming to the unsymmetrical area of said shank for preventing rotation of said bolt, each of said blades having a downwardly offset outer end to eliminate continuous beating of the grass or the like which is being cut.

10. A rotary cutter comprising a mobile frame including a deck, shaft means depending from said deck, blade means rotatably supported from said shaft means, and drive means engaged with said blade means in spaced relation to said shaft means for rotating the blade means about the longitudinal axis of the shaft means, said shaft means including a shaft fixedly attached to said deck generally in the central area thereof, said deck including at least a partial depending flange disposed peripherally of said blade means, said deck and flange being free of obstructions on the underside thereof to provide a smooth surface to the material being cut, one side of the deck and flange being offset outwardly of the center of rotation of the blade means thereby providing space for hay to clear the blade means thereby eliminating excessive shredding.

11. A rotary cutter comprising a mobile frame including a deck, shaft means depending from said deck, blade means rotatably supported from said shaft means, and drive means engaged with said blade means in spaced relation to said shaft means for rotating the blade means about the longitudinal axis of the shaft means, said shaft means including a shaft fixedly attached to said deck generally in the central area thereof, said deck including at least a partial depending flange disposed peripherally of said blade means, said deck being provided with a downwardly and rearwardly inclined shield disposed forwardly of the shaft means to prevent stumps and other obstructions from coming into engagement therewith.

12. A rotary cutter comprising a mobile frame including a deck, shaft means depending from said deck, blade means rotatably supported from said shaft means, and drive means engaged with said blade means in spaced relation to said shaft means for rotating the blade means about the longitudinal axis of the shaft means, said shaft means including a shaft fixedly attached to said deck generally in the central area thereof, said deck including at least a partial depending flange disposed peripherally of said blade means, said deck being provided with a depending baffle generally perpendicular thereto, said baffle extending inwardly toward the blade means and being inclined in the direction of rotation for feeding the material being cut back into the blade means for shredding the material into a fine consistency.

13. The cutter as defined in claim 12 wherein said blade means includes a disk, a plurality of blades on said disk, at least some of said blades having an upstanding projection on the upper surface thereof, each projection being inclined in order to cause inward air flow to convey material being cut from the sides of the cutter towards the center thereof and to prevent material from escaping from the ends of the blades.

14. The cutter as defined in claim 1 wherein said shaft includes a flange on the upper end thereof affixed to the deck, the mounting of the blade means on a hub eliminating application of the cutting load of the blade means to opposite sides of the shaft thereby reducing fatigue in the shaft normally caused by back and forth flexing.

15. A rotary cutter comprising a mobile frame including a deck, shaft means depending from said deck, blade means rotatably supported from said shaft means, and drive means engaged with said blade means in spaced relation to said shaft means for rotating the blade means about the longitudinal axis of the shaft means, said shaft means including a shaft fixedly attached to said deck generally in the central area thereof, said deck including at least a partial depending flange disposed peripherally of said blade means, said blade means including a plate, a plurality of blades disposed around the periphery of said plate, and means freely swingably attaching the blades to said plate, said means attaching the blades to the plate including a shouldered bolt extending through the blade and plate, a head on the bolt underlying the blade, the shoulder on the bolt engaging the plate and preventing the head from clampingly engaging the blade, a nut on said bolt engaging the plate in opposition to the shoulder for securing the bolt to the plate, said blade means also including a conical member having an annular inclined surface concentric with said shaft, an outer peripheral flange on said conical member disposed against said plate, said bolts extending through said flange as well as the plate and blades thereby securing the conical member to the plate thereby eliminating stresses set up by welding.

16. The cutter as defined in claim 15 wherein said conical member is provided with an inwardly extending crown resting on a shoulder on the hub means to prevent foreign material from getting between the components of the blade means, said crown being parallel to the plate and spaced vertically thereabove.

17. A rotary cutter comprising a mobile frame including a deck, shaft means depending from said deck, blade means rotatably supported from said shaft means, and drive means engaged with said blade means in spaced relation to said shaft means for rotating the blade means about the longitudinal axis of the shaft means, said shaft means including a shaft fixedly attached to said deck generally in the central area thereof, said blade means including a plate having a central hub affixed thereto, said hub being received on the lower portion of said stationary shaft, and bearing means rotatably journaling said hub on said shaft.

18. A rotary cutter comprising a mobile frame including a deck, shaft means depending from said deck, blade means rotatably supported from said shaft means, and drive means engaged with said blade means in spaced relation to said shaft means for rotating the blade means about the longitudinal axis of the shaft means, said shaft means including a shaft fixedly attached to said deck generally in the central area thereof, said blade means including an annular member having an inclined annular surface concentric with the shaft, said drive means including a circular drive wheel having an inclined drive surface in driving engagement with the inclined annular surface on said blade means, said drive wheel being rotatable about an axis perpendicular with and intersecting the axis of rotation of said blade means, and means adjustably supporting the drive wheel from the deck for varying the frictional engagement between the drive wheel and the annular surface on the blade means.

19. A rotary cutter comprising a mobile frame including a deck, shaft means supported from said deck, blade means rotatably supported by said shaft means, and drive means for rotating the blade means about the longitudinal axis of the shaft means, said blade means including a plate, a plurality of blades disposed around the periphery of said plate, a shouldered bolt extending through each blade and a corresponding portion of the plate, each bolt including a head underlying the blade, the shoulder on the bolt engaging the plate and preventing the head from clampingly engaging the plate, a nut on said bolt engaging the plate in opposition to the shoulder for securing the bolt to the plate, said bolt being provided with an unsymmetrical area on the portion of the shank which extends through the plate, said plate having an opening conforming to the unsymmetrical area of said shank for preventing rotation of said bolt.

References Cited by the Examiner
UNITED STATES PATENTS

| | | | |
|---|---|---|---|
| 2,522,112 | 9/1950 | Gilmour | 56—25.4 |
| 2,645,300 | 7/1953 | Watts et al | 56—25.4 X |
| 2,872,770 | 2/1959 | Murphy et al. | 56—25.4 |

ABRAHAM G. STONE, *Primary Examiner.*

RUSSELL R. KINSEY, *Examiner.*